United States Patent
Liu et al.

(10) Patent No.: US 11,669,459 B2
(45) Date of Patent: Jun. 6, 2023

(54) MULTIPLYING DATA STORAGE DEVICE READ THROUGHPUT

(71) Applicant: Seagate Technology LLC, Fremont, CA (US)

(72) Inventors: Xiong Liu, Singapore (SG); Li Hong Zhang, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 16 days.

(21) Appl. No.: 17/411,528

(22) Filed: Aug. 25, 2021

(65) Prior Publication Data

US 2021/0382827 A1 Dec. 9, 2021

Related U.S. Application Data

(62) Division of application No. 16/528,161, filed on Jul. 31, 2019, now Pat. No. 11,119,937.

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
None
See application file for complete search history.

(56) References Cited

U.S. PATENT DOCUMENTS

| | | |
|---|---|---|
| 4,424,561 A | 1/1984 | Stanley et al. |
| 5,226,010 A | 7/1993 | Glider et al. |
| 5,724,539 A | 3/1998 | Riggle et al. |
| 6,327,638 B1 | 12/2001 | Kirby |
| 6,434,666 B1 | 8/2002 | Takahashi et al. |
| 6,487,633 B1 | 11/2002 | Horst et al. |
| 8,190,784 B1 | 5/2012 | Raizen et al. |
| 9,298,393 B2 | 3/2016 | See et al. |
| 10,157,631 B2 | 12/2018 | Trantham et al. |

(Continued)

OTHER PUBLICATIONS

Gao, Kai-Zhong, "Temperature of Data in Storage Devices and Data Storage Solutions for the Next Decade", News and Views, International Business and Technology Service 2016, 2 pages.

(Continued)

*Primary Examiner* — Jane W Benner
(74) *Attorney, Agent, or Firm* — Westman, Champlin & Koehler, P.A.

(57) ABSTRACT

A data storage system includes a logical space having logical block addresses (LBAs) divided into non-overlapping LBA ranges, and a physical space having pairs of physical bands. The system also includes a map in which first successive alternate LBAs of each different one of the non-overlapping LBA ranges are mapped to successive adjacent physical blocks of a first physical band of each different pair of the pairs of physical bands, and second successive alternate LBAs of each different one of the non-overlapping LBA ranges are mapped to successive adjacent physical blocks of a second physical band of each different pair of the pairs of physical bands. A controller employs the map to concurrently read data from a first physical block of the first physical band of one pair of physical bands and from a first physical block of the second physical band of the same pair of physical bands.

15 Claims, 5 Drawing Sheets

(56) References Cited

U.S. PATENT DOCUMENTS

| | | |
|---|---|---|
| 2004/0184789 A1 | 9/2004 | Kinoshita et al. |
| 2007/0050593 A1 | 3/2007 | Chen et al. |
| 2007/0174582 A1* | 7/2007 | Feldman ............... G06F 3/0655 |
| | | 711/202 |
| 2015/0187384 A1* | 7/2015 | Song ................ G11B 20/10037 |
| | | 360/32 |
| 2016/0148645 A1 | 5/2016 | Zhu et al. |
| 2017/0322844 A1* | 11/2017 | Hong ................. G11B 20/1833 |
| 2018/0067849 A1 | 3/2018 | Kanno |
| 2018/0174613 A1 | 6/2018 | Zhu et al. |

OTHER PUBLICATIONS

Shilov, Anton, "Western Digital to Demo Dual-Actuator HDDs Next Week: Double the Actuators for Double the Performace", ANANDTECH, on Mar. 8, 2019 12:00 PM EST, https://www.anandtech.com/show/14066/western-digital-to-demo-dual-actuator-hdds-next-week.

Schlosser, Steven W. et al., "On multidimensional data and modern disks", USENIX Association, FAST '05: 4th USENIX Conference on File and Storage Tehnologies, 14 pages.

U.S. Patent Office issued prosecution for U.S. Appl. No. 16/528,161, filed Jul. 31, 2019, including: Notice of Allowance and Fees Due (PTOL-85) and Examiner Initiated Interview Summary dated Jun. 17, 2021, 16 pages; Restriction Requirement dated Feb. 3, 2021, 5 pages; 21 pages total.

* cited by examiner

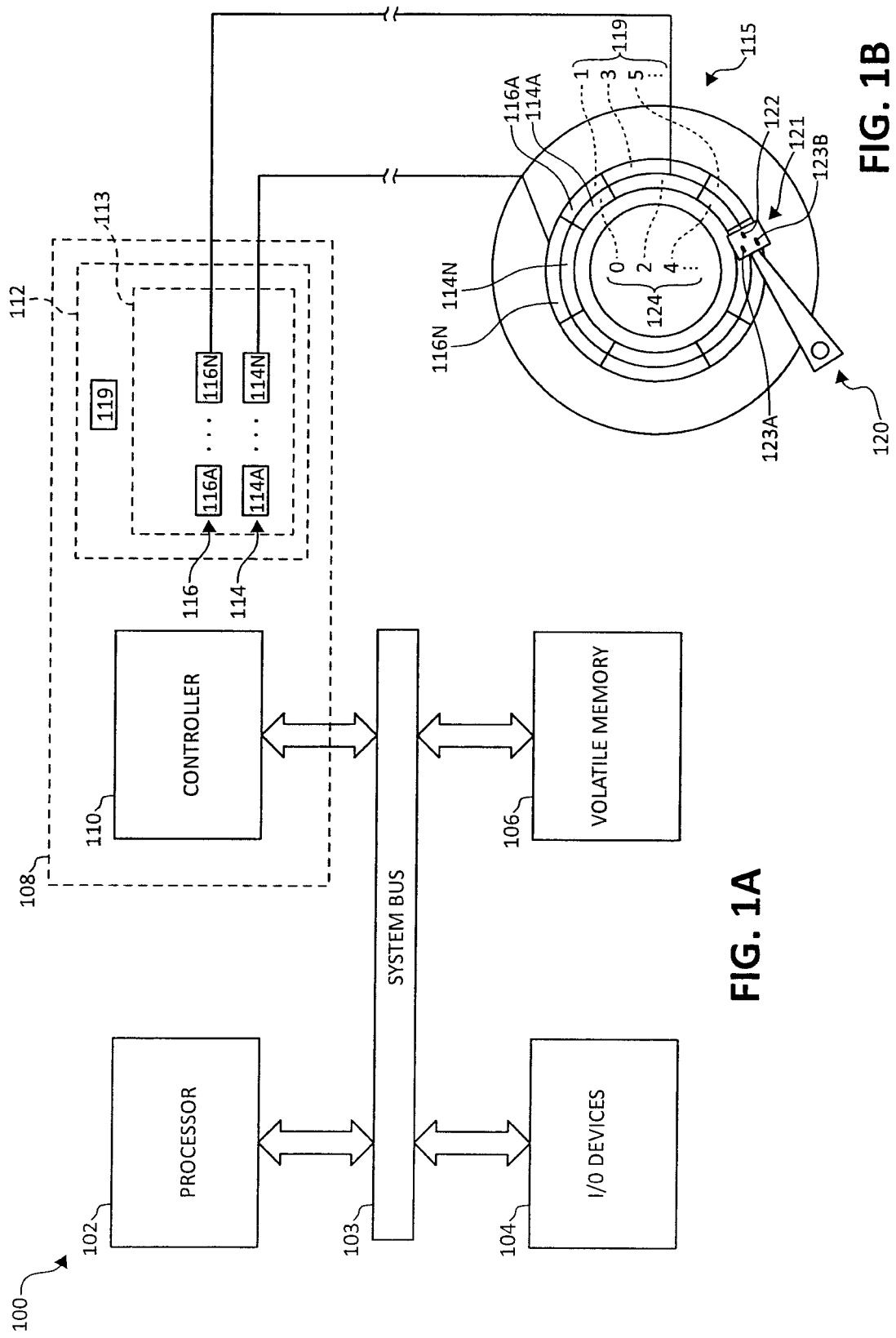

|  | | Trk 5 | Trk 4 | Trk 3 | Trk 2 | Trk 1 | Trk 0 |
|---|---|---|---|---|---|---|---|
| Trk n | Trk ... | | | 302B | | | 302A |
| ... | | 21 | 11 | 1 | 20 | 10 | ■ —304 |
| ... | | 23 | 13 | 3 | 22 | 12 | 2 |
| ... | ...... | 25 | 15 | 5 | 24 | 14 | 4 |
| ... | | 27 | 17 | 7 | 26 | 16 | 6 |
| ... | | 29 | 19 | 9 | 28 | 18 | 8 |

Band Size covers Trk 2, Trk 1, Trk 0.

FIG. 3B

|  | | | | | | | |
|---|---|---|---|---|---|---|---|
| ... | | 21 | 11 | 1 | 20 | 10 | 0 |
| ... | | 23 | 13 | 3 | 22 | 12 | 2 |
| ... | ...... | 25 | 15 | 5 | 24 | 14 | 4 |
| ... | | 27 | 17 | 7 | 26 | 16 | 6 |
| ... | | 29 | 19 | 9 | 28 | 18 | 8 |

|  | | | | | | | |
|---|---|---|---|---|---|---|---|
| ... | | 21 | 11 | 1 | 20 | 10 | 0 |
| ... | | 23 | 13 | 3 | 22 | 12 | 2 |
| ... | ...... | 25 | 15 | 5 | 24 | 14 | 4 |
| ... | | 27 | 17 | 7 | 26 | 16 | 6 |
| ... | | 29 | 19 | 9 | 28 | 18 | 8 |

MULTIPLYING DATA STORAGE DEVICE READ THROUGHPUT

CROSS-REFERENCE TO RELATED APPLICATION(S)

This application is a divisional of U.S. application Ser. No. 16/528,161, filed on Jul. 31, 2019, which published as U.S. Publication No. 2021/0034542 A1, on Feb. 4, 2021, the content of which is incorporated by reference in its entirety.

SUMMARY

In one embodiment, a data storage system includes a logical space having a plurality of logical block addresses (LBAs) divided into a plurality of non-overlapping LBA ranges, and a physical space having a plurality of pairs of physical bands. The system also includes a map in which first successive alternate LBAs of each different one of the plurality of non-overlapping LBA ranges are mapped to successive adjacent physical blocks of a first physical band of each different pair of the plurality of pairs of physical bands. Further, in the map, second successive alternate LBAs of each different one of the plurality of non-overlapping LBA ranges are mapped to successive adjacent physical blocks of a second physical band of each different pair of the plurality of pairs of physical bands. A controller employs the map to substantially concurrently read data from a first physical block of the first physical band of one of the plurality of pairs of physical bands and from a first physical block of the second physical band of the same one of the plurality of pairs of physical bands, thereby substantially concurrently obtaining data for successive LBAs of the plurality of LBAs.

In another embodiment, a method includes dividing a logical space having a plurality of logical block addresses (LBAs) into a plurality of non-overlapping LBA ranges. The method also includes providing a physical space having a plurality of pairs of physical bands. The method further includes forming a map by mapping first successive alternate LBAs of each different one of the plurality of non-overlapping LBA ranges to successive adjacent physical blocks of a first physical band of each different pair of the plurality of pairs of physical bands, and mapping second successive alternate LBAs of each different one of the plurality of non-overlapping LBA ranges to successive adjacent physical blocks of a second physical band of each different pair of the plurality of pairs of physical bands.

In yet another embodiment, an apparatus includes a physical space having a plurality of P physical bands, with each physical band having a plurality of X physical blocks. The apparatus also includes a logical space having a plurality of N logical block addresses (LBAs) divided into X non-overlapping LBA ranges, with each of the X non-overlapping LBA ranges having P consecutive LBAs. The apparatus further incudes a map in which an $i^{th}$ physical block of each different one of the plurality of P physical bands is mapped to a different one of the P consecutive LBAs of the $i^{th}$ one of the X non-overlapping LBA ranges. A controller employs the map to substantially concurrently read data from the $i^{th}$ physical blocks of all of the P physical bands, thereby substantially concurrently obtaining data for the LBAs of the $i^{th}$ one of the X non-overlapping LBA ranges.

This summary is not intended to describe each disclosed embodiment or every implementation of multiplying data storage device read throughput as described herein. Many other novel advantages, features, and relationships will become apparent as this description proceeds. The figures and the description that follow more particularly exemplify illustrative embodiments.

BRIEF DESCRIPTION OF THE DRAWINGS

FIG. 1A is a simplified block diagram of an illustrative embodiment of a system of data storage management.

FIG. 1B shows a representative disc of a disc drive on which embodiments of the present disclosure may be practiced.

FIGS. 3B-3D are diagrammatic illustrations that together illustrate write and read operations carried out in accordance with an embodiment of the disclosure.

DETAILED DESCRIPTION OF ILLUSTRATIVE EMBODIMENTS

Figures 2A, 2B:
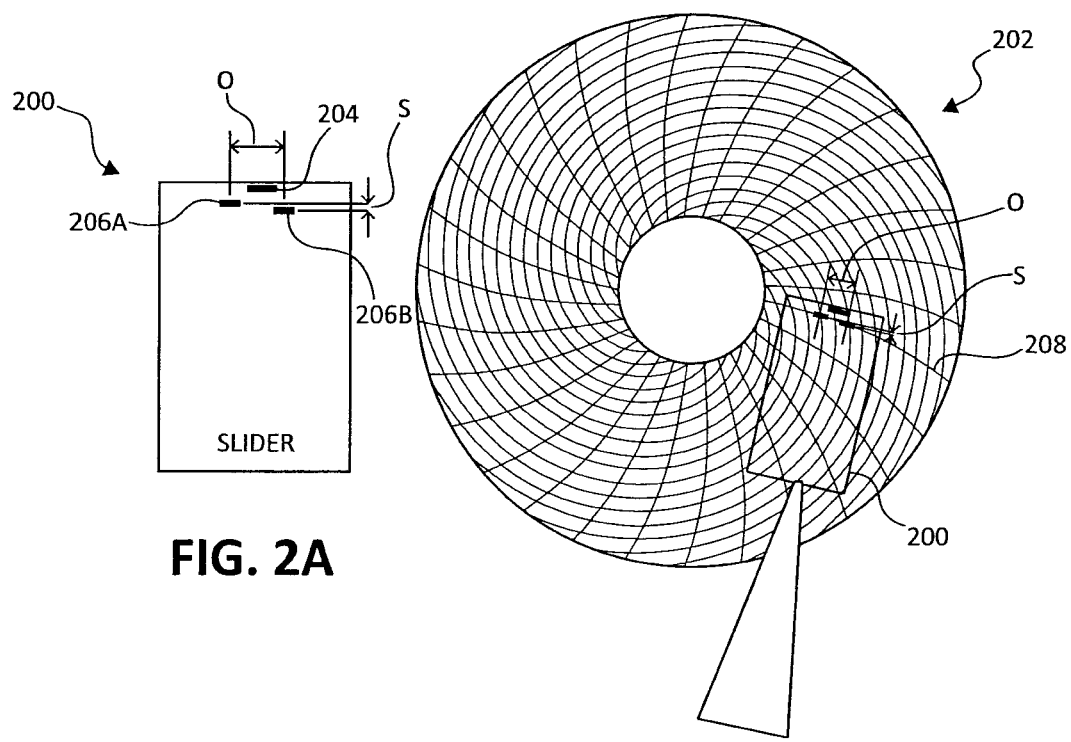
FIG. 2A is a diagrammatic illustration of a slider in accordance with one embodiment.
FIG. 2B is a top view showing the slider of FIG. 2A over a data storage medium.

Embodiments of the disclosure provide techniques for increasing read throughput in data storage devices.

Data storage devices (e.g., hard disc drives (HDDs)) employed in document storage applications (e.g., digital libraries and databases) read back data from recording media much more frequently than they write data to the media. In many cases, a HDD only writes a batch of data once onto the media, but reads back the written data numerous times. Different embodiments described herein in connection with FIGS. 1A-4 enable simultaneous reading of multiple data blocks or sectors, thereby supporting a high read throughput demand.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Referring to FIG. 1A, a particular embodiment of a system of data storage management is shown and generally designated 100. The system of data storage management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory. The system bus may additionally be coupled to a data storage device 108.

The data storage device 108 may include a controller 110, which may be coupled to the processor 102 via a connection through the system bus 103. In one embodiment, the data storage device 108 comprises at least one storage entity 112. In a particular embodiment, storage entity 112 includes one or more memories or data storage media. As shown in FIG. 1A, storage entity 112 is further organized as a main store 113, such as one or more platters or discs of a disc drive as shown in FIG. 1B. The main store 113 includes a plurality of physical elements such as a first physical element 114 (e.g., a first physical track or band including blocks or sectors 114A-114N shown in FIG. 1B) and a second physical element 116 (e.g., a second physical track or band 116A-116N shown in FIG. 1B). A suitable logical-physical map 119 is included to help provide a relatively high read throughput. A description of how the relatively high read throughput is obtained is described below in connection with FIG. 1B.

In the embodiment of FIG. 1B, the disc drive employs an actuator 120 that includes a slider 121 with a writer 122 and two readers 123A and 123B that communicate with disc surface 115. In the embodiment of FIG. 1B, the disc drive includes a logical space having a plurality of logical block addresses (LBAs) that are mapped to physical blocks or sectors (e.g., 114A-114N and 116A-116N on disc surface 115). The mapping information (e.g., logical-physical map 119 of FIG. 1A) is stored in any suitable memory of the disc drive. In one embodiment, the mapping of the plurality of LBAs to physical blocks on disc surface 115 is such that first successive alternate LBAs 124 (e.g., successive even LBAs 0, 2, 4, etc.) of the plurality of LBAs are mapped to successive adjacent physical blocks (e.g., 114A-114N) of first physical track or band 114, and second successive alternate LBAs 126 (e.g., successive odd LBAs 1, 3, 5, etc.) of the plurality of LBAs are mapped to successive adjacent physical blocks (e.g., 116A-116N) of the second physical track or band 116. A control circuit (such as 110 of FIG. 1A) employs the map 119 to substantially concurrently read data from a first physical block (e.g., 114A) of the first physical track or band 114 and from a first physical block (e.g., 116A) of the second physical track or band 116, thereby substantially concurrently obtaining data for successive LBAs of the plurality of LBAs to improve throughput. In the embodiments shown in FIG. 1B, the first physical block 114A of the first physical track or band 114 and the first physical block 116A of the second physical track or band 116 are substantially concurrently read by readers 123A and 123B, respectively, included on the same slider 121 and coupled to the controller 110. Details regarding placement of readers in a slider and logical-physical mapping details are provided herein in connection with FIGS. 2A-4.

FIG. 2A is a diagrammatic illustration of a slider 200 in accordance with one embodiment, and FIG. 2B is a top view showing slider 200 over a data storage medium 202. Slider 200 includes a writer 204 and two readers 206A and 206B. As can be seen in FIGS. 2A and 2B, readers 206A and 206B are laterally separated by an offset "O," and also have a relatively small separation "S" in the down-track direction. "O" and "S" may be predetermined to substantially maximize readback performance. Readers 206A and 206B read different LBA data on data storage medium 202 concurrently to fulfill a host read command. "S" is designed to help ensure that readers 206A and 206B are able to cross servo wedges (or servo arcs) 208 substantially concurrently during reading. Actual values of "O" and "S" may be measured during a HDD certification test. Such a test may also determine a reader-writer offset (or magnetoresistance offset) for readers 206A and 206B.

Figure 3A:
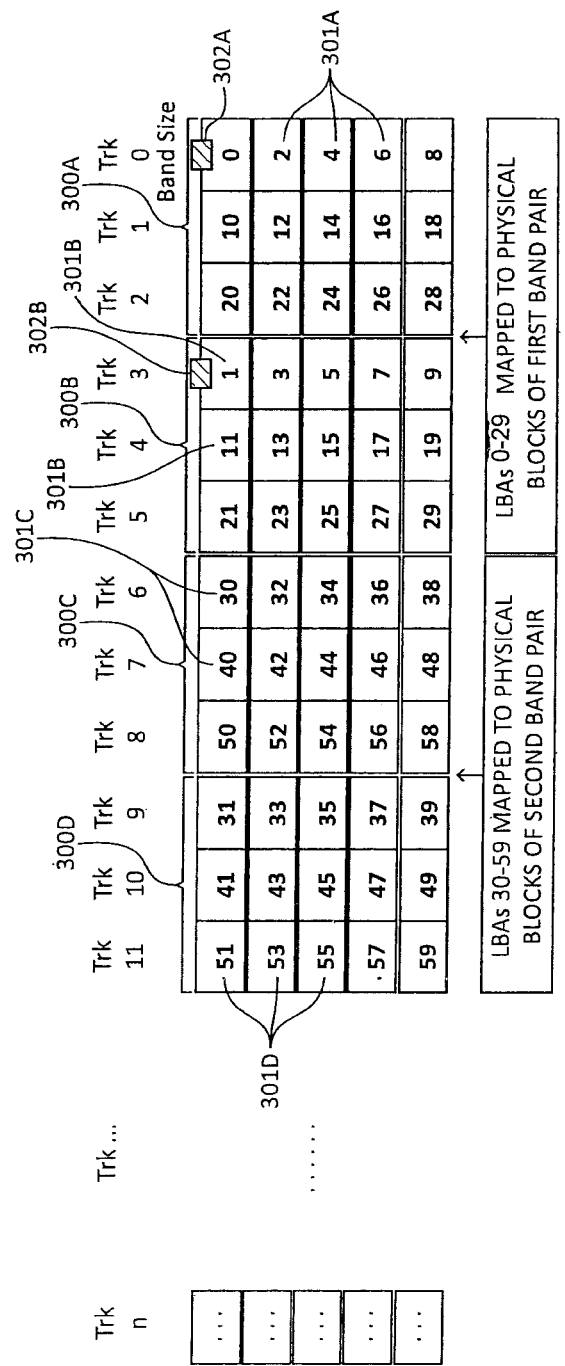
FIG. 3A is a diagrammatic illustration of an example logical block address (LBA) layout that may be employed with a dual reader slider in accordance with one embodiment.

FIG. 3A is a diagrammatic illustration of an example LBA layout that may be employed with a dual reader of the type shown in FIG. 2A. In the example embodiment of FIG. 3A, tracks 0-N are divided into a plurality of physical bands, with each of the plurality of bands 300A, 300B, 300C, 300D, etc., including three tracks. It should be noted that, in different embodiments, each band may include any suitable number of tracks, which may be greater or less than three tracks. Band 300A includes physical blocks 301A, band 300B includes physical blocks 301B, band 300C includes physical blocks 301C, and band 300D includes physical blocks 301D. Two readers 302A and 302B within a same slider can substantially simultaneously read from physical blocks (e.g., 301A and 301B, 301C and 301D) of two adjacent bands (e.g., 300A and 300B, 300C and 300D), referred to herein as a pair of bands.

In the embodiment of FIG. 3A, a logical space including a plurality of LBAs is divided into a plurality of non-overlapping LBA ranges (e.g., 60 LBAs are divided into two equal ranges (LBAs 0-29 and LBAs 30-59)). Further, first successive alternate LBAs (e.g., even LBAs 0, 2, 4, etc., and 30, 32, 34, etc.) of each different one of the plurality of non-overlapping LBA ranges (e.g., 0-29 and 30-59) are mapped to successive adjacent physical blocks of a first physical band of each different pair of the plurality of pairs of physical bands (e.g., even LBAs 0, 2, 4, etc., are mapped to successive physical blocks 301A and even LBAs 30, 32, 34, etc., are mapped to successive physical blocks 301C). Additionally, second successive alternate LBAs (e.g., odd LBAs 1, 3, 5, etc., and 31, 33, 35, etc.) of each different one of the plurality of non-overlapping LBA ranges (e.g., 0-29 and 30-59) are mapped to successive adjacent physical blocks of a second physical band of each different pair of the plurality of pairs of physical bands (e.g., odd LBAs 1, 3, 5, etc., are mapped to successive physical blocks 301B and odd LBAs 31, 33, 35, etc., are mapped to successive physical blocks 301D). As will be described herein in connection with FIG. 3B, a control circuit (e.g. 110 of FIG. 1A), with the help of readers 302A and 302B, employs the odd-even LBA mapping to substantially concurrently read data from a first physical block of the first physical band of one of the plurality of pairs of physical bands and from a first physical block of the second physical band of the same one of the plurality of pairs of physical bands, thereby substantially concurrently obtaining data for successive LBAs of the plurality of LBAs. Because readers 302A and 302B are separated by an offset, each reader 302A, 302B, reads a finite band of data (e.g., three tracks in FIG. 3A) before encountering a band edge of the other reader 302A, 302B. Accordingly, band seeking replaces current single track seeking for sequential write/read operations when a band edge is reached.

FIGS. 3B-3D are diagrammatic illustrations that together illustrate write and read operations carried out in accordance with an embodiment of the disclosure. As in the case in FIG. 3A, it is assumed that there are three tracks per band and five blocks per track. If, for example, a host command for writing LBA0 to LBA15 is received, the data storage device first designs a write pattern to match the concurrent readback by readers 302A and 302B. In one embodiment, a writer 304 (shown in FIG. 3B), which may be within the slider that includes readers 302A and 302B, first writes to even LBAs (0, 2, 4, 6, 8, 10, 12 and 14) of Track-0 and Track-1 (as shown in FIG. 3C) for subsequent reading by reader 302A. Then, writer 304 writes to odd LBAs (1, 3, 5, 7, 9, 11, 13 and 15) of Track-3 and Track-4 (as shown in FIG. 3D) for subsequent reading by reader 302B.

During readback, reader 302A reads LBAs 0, 2, 4, 6 and 8 on Track-0 together with reader 302B reading LBAs 1, 3, 5, 7 and 9 on Track-3. Readers 302A and 302B then seek together by one track to Track-1 and Track-4, respectively, where reader 302A reads LBAs 10, 12 and 14 on Track-1 and reader 302B reads LBAs 11, 13 and 15 on Track-4. With both readers 302A and 302B reading odd and even LBAs respectively from different tracks, the host gets the same data in half the time that a single reader would take.

Referring back to FIG. 2A, to optimize both areal density capability (ADC) and performance, the reader-reader gap "O" may be between 100 tracks to 1000 tracks. An optimal ADC may generally be obtained using variable bit aspect ratio (VBAR) tuning. An "O" that is too small will impact the ADC since band size should be a round-up integer in terms of number of tracks during VBAR tuning; the round-up may affect tracks per inch (TPI) and therefore it may hinder the maximum ADC tuning. An "O" that is too large will increase seek time between band seeks. As noted above, "S' is selected to ensure that both readers cross over a servo wedge concurrently.

A gap (Δ) between two readers in a cross-track direction is determined by $$\Delta = O\cos(\alpha) + S\sin(\alpha) \quad \text{Equation 1}$$

where α is a skew angle (e.g., an angle that is formed between a centerline that runs through an actuator pivot point (e.g., a pivot point of actuator 120 of FIG. 1B) and recording head (e.g., slider 121 of FIG. 1B) along the length of the actuator arm and a line that is tangential to a track at the location of the recording head). Δ is fixed at a given radial distance from a disc center, but varies for different radial distances from the disc center. A band size may be determined based on a selected kilo track per inch (kTPI) value and on a calculated Δ value. The band size may then be rounded up (or rounded off) to the nearest whole number (e.g., integer). Then, the kTPI value may be adjusted slightly in accordance with the integer values of band size. An example of band size determination and kTPI calculation is provided below. In the following example, intermediate calculations are left out in the interest of simplification. For example, a selected data kTPI=520.345 cross-track (Δ)=23.559 micrometers (um), which equals to 482.6 tracks a rounded up band size is therefore 483 for band size 483, a calculated data kTPI is 520.744, which is the adjusted kTPI value.

From the above description and example, it is seen that band size is a function of a radial distance from the disc center and a selected kTPI at that radial distance. Further, band size determines the LBA layout.

The above-described embodiments primarily relate to sliders with two readers. However, in different embodiments, sliders with more than two readers may be employed, and such embodiments may employ suitable logical-physical mapping schemes.

Figure 4:
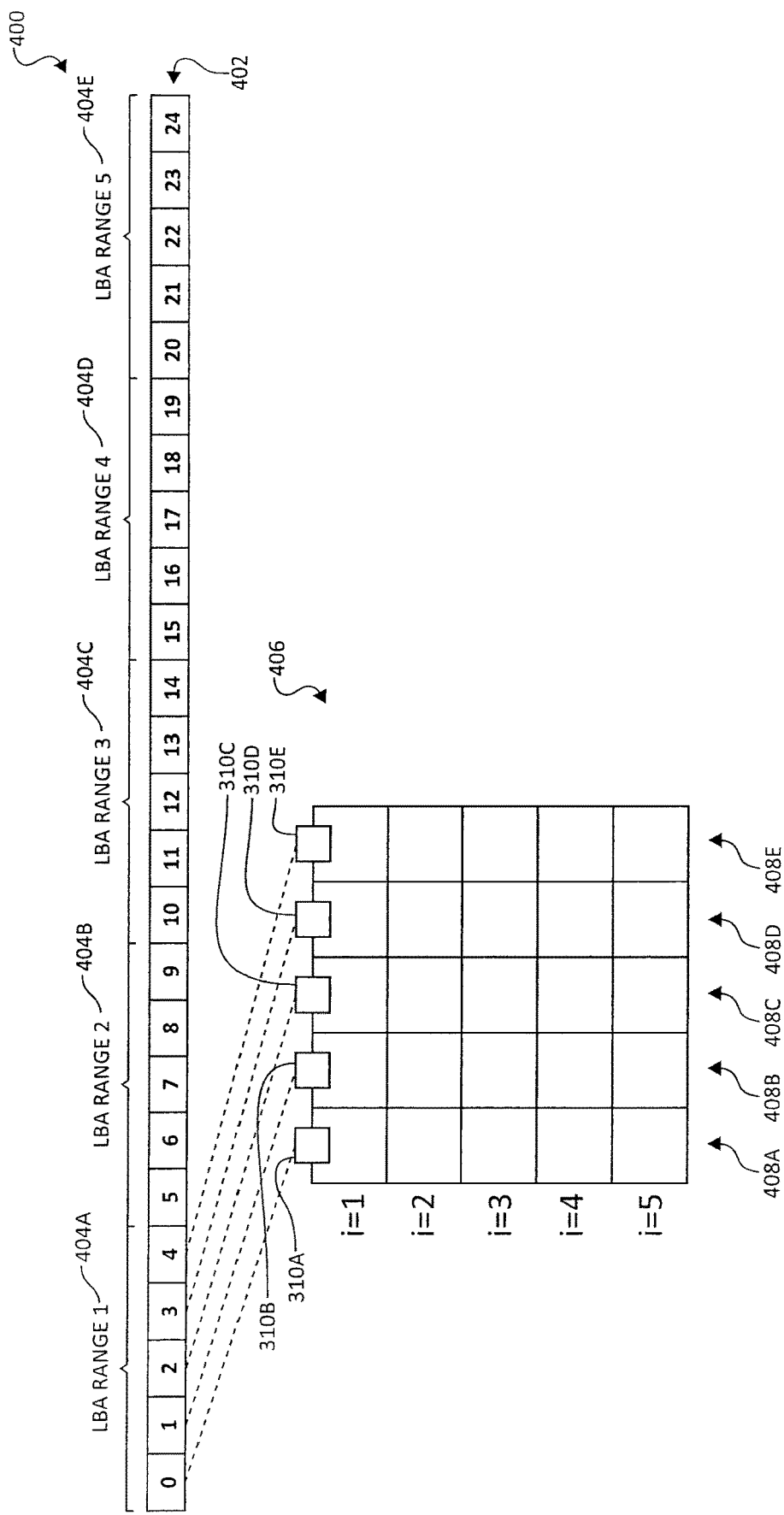
FIG. 4 is a diagrammatic illustration of a logical-physical map in accordance with one embodiment.

FIG. 4 is a diagrammatic illustration of a logical-physical mapping system 400 in accordance with one embodiment that may be employed by a data storage system that includes at least one slider having a plurality of readers. System 400 includes a logical space 402 having N LBAs (e.g., N=25), with the logical space 402 being divided into X non-overlapping LBA ranges (e.g., X=5). The 5 LBA ranges are denoted by reference characters 404A, 404B, 404C, 404D and 404E. Each non-overlapping LBA range 404A, 404B, 404C, 404D, 404E includes P consecutive LBAs (e.g., P=5 consecutive LBAs). System 400 further includes a physical space 406 including P physical bands (e.g., P=5). The 5 physical bands are denoted by reference characters 408A, 408B, 408C, 408D and 408E. Each physical band has a plurality of physical blocks (e.g., 5 physical blocks). In the embodiment of FIG. 4, the mapping is such that an $i^{th}$ physical block of each different one of the plurality of P physical bands is mapped to a different one of the P consecutive LBAs of the $i^{th}$ one of the X non-overlapping LBA ranges. A controller (not shown in FIG. 4) may employ the map to substantially concurrently read data from the $i^{th}$ physical blocks of all of the P physical bands (e.g., using readers 310A, 310B, 310C, 310D and 310E that may be within a same slider), thereby substantially concurrently obtaining data for the LBAs of the $i^{th}$ one of the X non-overlapping LBA ranges.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a physical space comprising a plurality of P physical bands, with each physical band having a plurality of X physical blocks;
   a logical space comprising a plurality of N logical block addresses (LBAs) divided into X non-overlapping LBA ranges that are equal in number to the plurality of X physical blocks, with each of the X non-overlapping LBA ranges comprising P consecutive LBAs that are equal in number to the plurality of P physical bands;
   a map in which an $i^{th}$ physical block of each different one of the plurality of P physical bands is mapped to a different one of the P consecutive LBAs of the $i^{th}$ one of the X non-overlapping LBA ranges; and
   a controller configured to employ the map to read data from the $i^{th}$ physical blocks of all of the P physical bands in parallel, thereby obtaining data for the LBAs of the $i^{th}$ one of the X non-overlapping LBA ranges in parallel.

2. The apparatus of claim 1 and wherein the physical space comprises a disc surface having the plurality of P physical bands.

3. The apparatus of claim 2 and wherein each of the plurality of P physical bands comprises at least one track.

4. The apparatus of claim 3 and wherein the data from the $i^{th}$ physical blocks of all of the P physical bands are read in parallel by P readers included in a same slider and coupled to the controller.

5. The apparatus of claim 4 and wherein an offset between adjacent ones of the P readers corresponds to a number of tracks in a band of the plurality of P physical bands.

6. The apparatus of claim 4 and wherein the controller is configured to write data to the $i^{th}$ physical blocks of all of the P physical bands by a writer included in the same slider that comprises the P readers.

7. The apparatus of claim 4 and wherein the controller is further configured to read servo wedges in parallel with the P readers.

8. A method comprising:
providing a physical space having a plurality of P physical bands, with each physical band having a plurality of X physical blocks;
dividing a logical space having a plurality of N logical block addresses (LBAs) into X non-overlapping LBA ranges that are equal in number to the plurality of X physical blocks, with each of the X non-overlapping LBA ranges comprising P consecutive LBAs that are equal in number to the plurality of P physical bands; and
forming a map by mapping an $i^{th}$ physical block of each different one of the plurality of P physical bands to a different one of the P consecutive LBAs of the $i^{th}$ one of the X non-overlapping LBA ranges.

9. The method of claim 8 and further comprising employing the map to read data from the $i^{th}$ physical blocks of all of the P physical bands in parallel, thereby obtaining data for the LBAs of the $i^{th}$ one of the X non-overlapping LBA ranges in parallel.

10. The method of claim 9 and wherein providing the physical space having the plurality of P physical bands comprises providing a disc surface having the plurality of P physical bands.

11. The method of claim 10 and further comprising providing each of the plurality of P physical bands with at least one track.

12. The method of claim 11 and wherein the data from the $i^{th}$ physical blocks of all of the P physical bands are read in parallel by P readers included in a same slider.

13. The method of claim 12 and wherein an offset between adjacent ones of the P readers corresponds to a number of tracks in a band of the plurality of P physical bands.

14. The method of claim 12 and further comprising writing data to the $i^{th}$ physical blocks of all of the P physical bands by a writer included in the same slider that comprises the P readers.

15. The method of claim 12 and further comprising reading servo wedges in parallel with the P readers.

* * * * *